H. R. DE BRA.
SELECTOR FOR GEAR SHIFTING MECHANISM.
APPLICATION FILED DEC. 19, 1916. RENEWED OCT. 15, 1917.
1,247,509.
Patented Nov. 20, 1917.
3 SHEETS—SHEET 2.
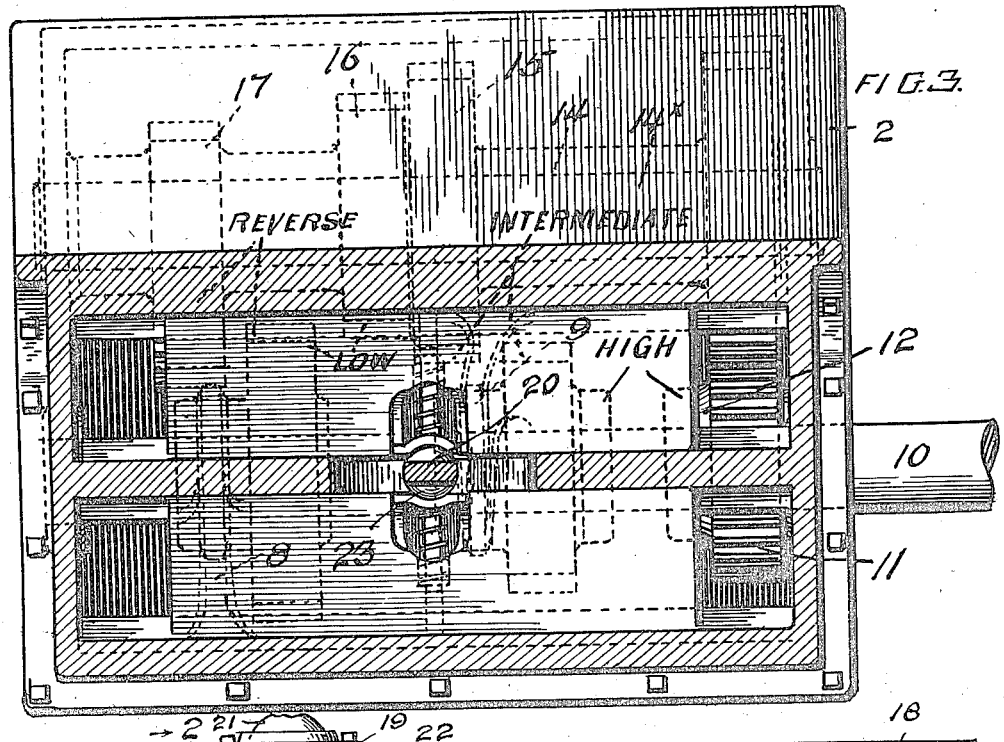
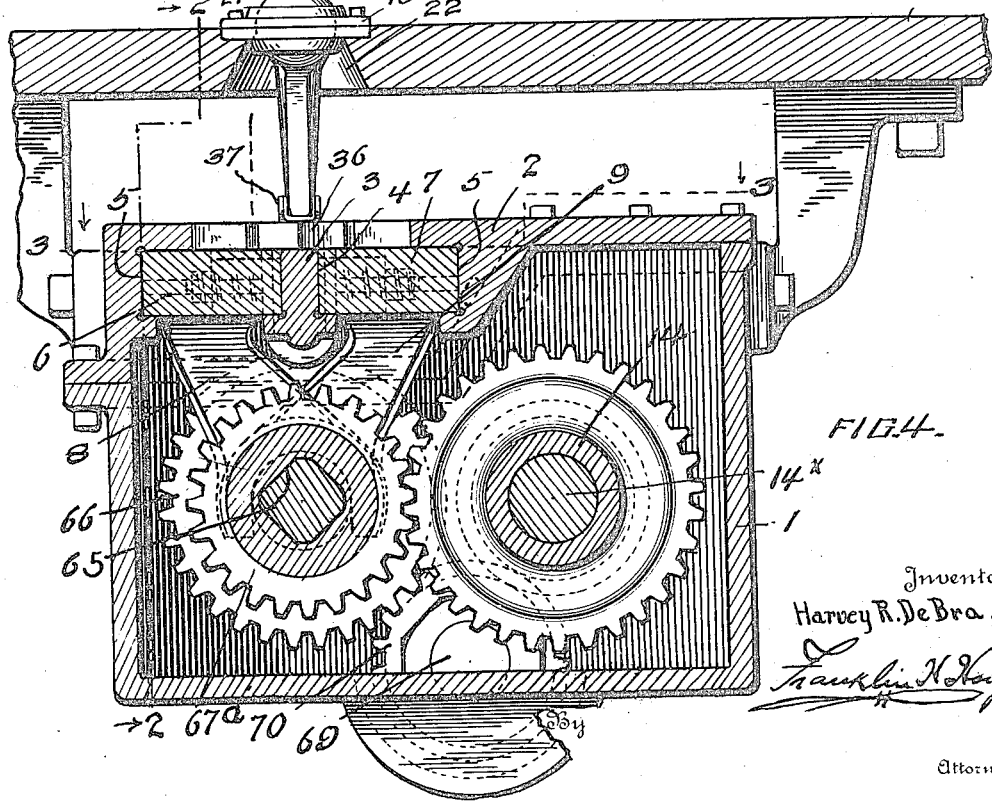
Inventor
Harvey R. De Bra,
by Franklin H. Hough
Attorney

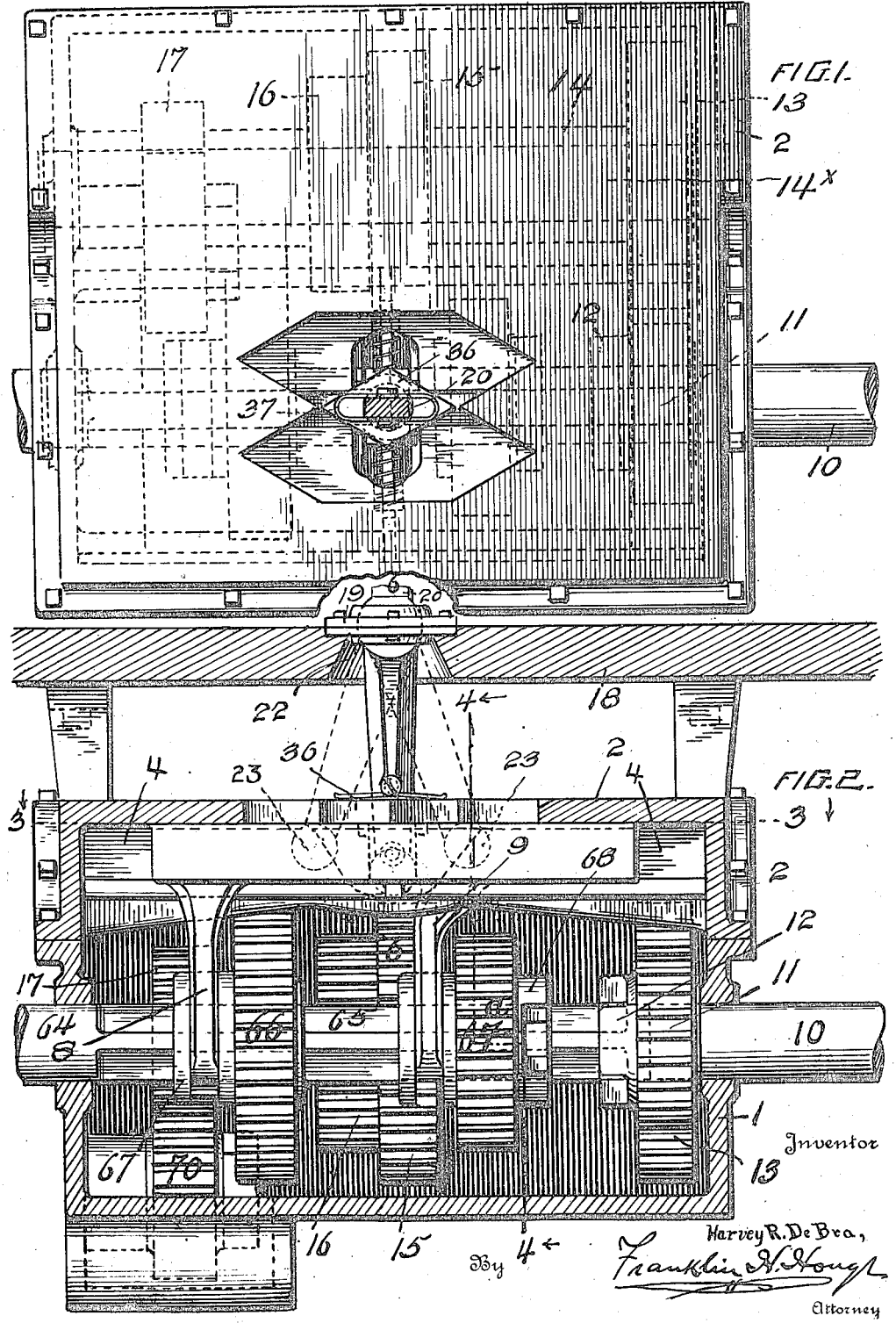

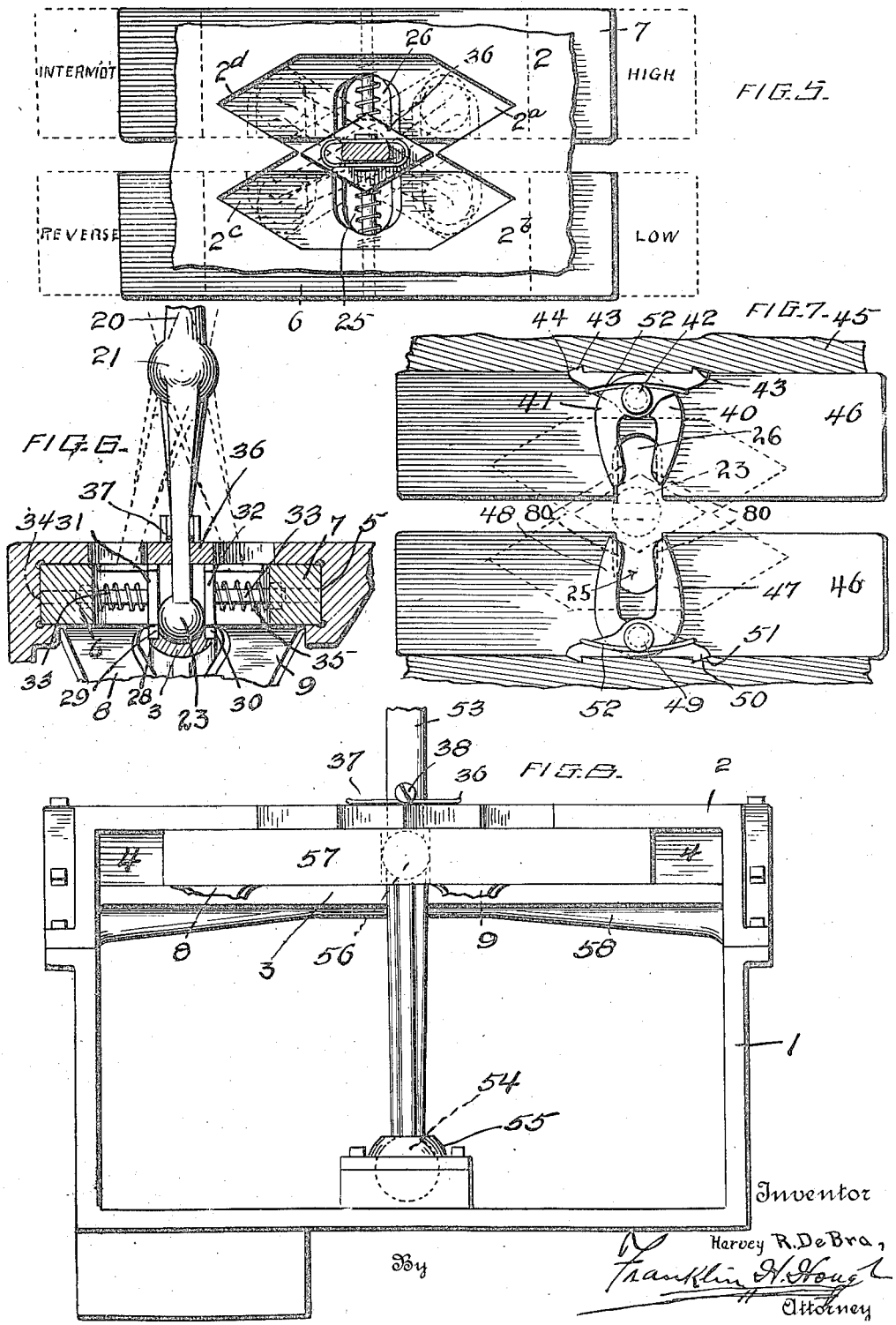

UNITED STATES PATENT OFFICE.

HARVEY R. DE BRA, OF CAMERON, MISSOURI.

SELECTOR FOR GEAR-SHIFTING MECHANISM.

1,247,509.　　　　Specification of Letters Patent.　　Patented Nov. 20, 1917.

Application filed December 19, 1916, Serial No. 137,829. Renewed October 15, 1917. Serial No. 196,722.

*To all whom it may concern:*

Be it known that I, HARVEY R. DE BRA, a citizen of the United States, residing at Cameron, in the county of Clinton and State of Missouri, have invented certain new and useful Improvements in Selectors for Gear-Shifting Mechanism; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in selector control apparatus for engines and comprises a simple and efficient apparatus of this nature having various details of construction, combinations and arrangements of parts which will be hereinafter fully defined, shown in the accompanying drawings and then specifically defined in the appended claims.

My invention is illustrated in the accompanying drawings, in which:—

Figure 1 is a top plan view of the apparatus.

Fig. 2 is a sectional view on line 2—2 of Fig. 4.

Fig. 3 is a sectional view on line 3—3 of Fig. 2.

Fig. 4 is a section on line 4—4 of Fig. 2.

Fig. 5 is a top plan view showing the different positions of selector plates and means for operating the same.

Fig. 6 is a vertical sectional view on line 6—6 of Fig. 2.

Fig. 7 is a top plan view of a modified form of locking mechanism.

Fig. 8 is a side elevation showing a modified form of the control lever mechanism.

Reference now being had to the details of the drawings by numeral, 1 designates the selector box and 2 the top therefor, which is bolted to the box, and is provided with a recess having V-shaped portions $2^a$, $2^b$, $2^c$ and $2^d$, as shown clearly in Figs. 1 and 5 of the drawings. Said plate has a downwardly projecting bridge portion 3, shown in sectional view in Fig. 4 of the drawings, the opposite faces of which are recessed as at 4, and other recesses, designated by numeral 5, are formed in the wall of the flanges of the cover, said recesses forming guides for the two selector plates 6 and 7.

Integral with the plate 6 is a forked bracket arm 8 and a similar forked arm 9 projects from the plate 7, as shown in Figs. 2 and 4 of the drawings.

The drive shaft of the engine is designated by numeral 10 and has a bearing in the selector box and to which shaft the gear wheel 11 is keyed, which latter has a hub 12 projecting from one face thereof. The gear 11 meshes with a gear wheel 13 upon a sleeve 14, on shaft $14^x$, shown in dotted lines in Fig. 1 of the drawings. An intermediate gear wheel 15 and a low gear wheel 16 are also fixed to and rotate with the sleeve 14 as does also the reverse gear 17.

Mounted in suitable bearings 19 upon the floor 18 is a control lever 20 having a spherical-shaped portion 21 mounted in the bearings 19. Said lever extends through an aperture 22 in said floor and has its lower end 23 oval or spherical-shaped, as shown clearly in Fig. 6 of the drawings.

It will be noted upon reference to Fig. 5 of the drawings that the inner edge of each of the two selector plates 6 and 7 have recesses 25 and 26 respectively, into which the oval or spherical-shaped end 23 of the lever is adapted to be thrown, as shown in dotted lines in Fig. 5 of the drawings. Said downwardly projecting bridge portion 3 is formed integral with the cover 2 and is provided at its opposite edges with notches 28 to receive the lugs 29, and 30, which are respectively formed integral with the plates 31 and 32. Each of said locking plates is provided with a stem 33, movable in an aperture 34 in the plates 6 and 7, and a coiled spring 35 is mounted upon each of said stems and bears intermediate a plate and the bottom wall of a recess therein, the purpose of said springs being to normally return the plates to locking positions after having been shifted through the medium of the lever 20.

A diamond-shaped plate, designated by numeral 36, has a slot therein through which said control lever passes and a spring 37 is fastened to the lever through the medium of the set screws 38 and has two bowed portions bearing yieldingly against the upper surface of the diamond-shaped plate 36 and serves to hold the same upon the upper surfaces of the plates 6 and 7 in whatever positions said diamond-shaped plate may be thrown into through the medium of said control lever.

In Fig. 7 of the drawings, I have shown a slight modification of the locking means which may be utilized in substitution for that disclosed in Fig. 6 of the drawings, if desired, and which consists of two jaws, designated respectively by numerals 40 and 41, pivotally mounted upon the pivot 42 upon one of the slotted plates 46 and the ends of the shank portions of said jaws have laterally extending lugs 43 which engage recess 44 formed in the cover 45. Similar jaws, designated respectively by numerals 47 and 48, are mounted upon a pivot 49 and have lugs 50 engaging recesses 51 in the cover 45 and coiled springs, designated by numerals 52, serve to normally hold the lugs upon the ends of said shank portions of the jaws into engagement with the recesses 44 and 51 upon the cover. Said jaws, which are arranged in reverse relation to each other, are adapted to engage the recesses 44 and 51 to hold the plates 46 locked in neutral position, the same manner as the plates 6 and 7, before described, are held in locked position through the medium of the plates 31 and 32, shown in Fig. 6 of the drawings.

In Fig. 8 of the drawings, I have shown a slight modification of the control lever mechanism, in which the lever 53 has its lower spherical end 54, shown in dotted lines in Fig. 8, as being mounted in the bearings 55 and has a spherically-shaped portion 56 which engages the recessed portions of the selector plate 57, which latter is supported by the bridge 58, as shown clearly in Fig. 2.

A shaft 64 is journaled in an aperture in one end of the selector box and in the hub of the gear 11 and has a square portion 65 upon which the combined low and reverse gear wheel 66 is splined, which latter has a hub portion 67 with a circumferential groove engaged by the arms of the bracket member 8, and a similar combined high and intermediate gear wheel 67ª is also splined upon the square outlined portion of said shaft and has a clutch hub portion 68 adapted, when moved to the right, to mesh with the clutch hub 12 upon the gear wheel 11.

In Fig. 4 of the drawings will be seen a counter shaft 69 upon which a reversing gear wheel 70 is journaled which is adapted to mesh with the gear wheel 17 (see Figs. 1, 2, and 3), mounted upon the sleeve 14, and gear 66, which constitutes the train of reverse gears.

The operation of my invention is as follows: Assuming that the control lever is in neutral position, as shown in Fig. 6 of the drawings, and it is desired to throw the gear into low, the operator by pushing upon the upper portion of the lever may cause the spherical-shaped end 23 to bear against the plate 31, releasing the same from the notch in the bridge 3 and will cause the selector plate 6 to move to the right, the diamond-shaped plate 36 entering the V-shaped recess 2ᵇ. This tilting movement of the lever will cause the gear wheel 66 to be thrown into mesh with the gear wheel 16 and cause shaft 64 to reverse at low speed. In the event of it being desired to throw from low to intermediate, the operator tilts the lever back toward its normal position and continues on to the right, when the lever arrives at neutral position, the plate 31 will be returned to its normal position through the medium of the spring bearing against the same and the selector plate 6 will be locked with low gear 66 out of mesh with gear 16 in the position shown in Fig. 2. A further swinging movement of the lever will cause the spherical-shaped end 23 to bear against the plate 32 to throw same out of locked relation with the bridge 3 and move into the recess in the selector plate 7, causing the same to move and the diamond-shaped plate to enter the V-shaped recess 2ᵈ. This movement of the lever will cause the gear wheel 67ª to be thrown into mesh with the intermediate gear 15. In the event of it being desired to throw the control lever from intermediate to high position, the lever is swung to the left, the diamond-shaped plate 36 being thrown from the dotted position in the V-shaped recess 2ᵈ to the similar shaped recess 2ª and in this movement of the lever the selector plate 7 will be moved longitudinally to the right and with it the hub clutch 68 of the wheel 67ª will be thrown into mesh with the hub clutch 12 of the wheel 11. The swinging of the lever from high position to neutral will return the parts to their normal positions in which the selector plates will be locked in the manner shown in Fig. 6 of the drawings.

To throw the control lever to reverse position, it is swung so that the diamond-shaped plate 36 will engage the V-shaped recess 2ᶜ, which will cause the wheel 66 to intermesh with the reverse gear wheel 70 which in turn meshes with the gear wheel 17 on the sleeve 14.

The jaws 40 and 41, 47 and 48 may have projections 80, shown in dotted lines in Fig. 7, extending into slots 25 and 26 in plates 46, so that the moving spherical end of lever 20 will come in contact therewith and withdraw the lugs from the recesses and unlock the plates. Lugs 43 and 50 preferably lock with the recesses at their inner edges as will be seen in Fig. 7.

By reference to Fig. 2, it will be seen that shaft 10 carrying gear 11 is adapted to revolve independently of shaft 64. The inner end of shaft 64, being journaled in the hub of gear wheel 11, receives its movement through the meshing of one of the trains of gears.

What I claim to be new is:—

1. A selector control apparatus comprising a selector boxing having guideways therein, movable selector plates movable in said guideways, a locking plate carried by each selector plate and normally holding the selector plates in neutral positions, a movable control lever designed to release said locking plates and move the selector plates, selector gears, and connections between the same and the selector plates.

2. A selector control apparatus comprising a selector boxing having a top with an angular-outlined recess therein, selector plates movable in suitable guideways in said cover, means for locking the plates in neutral positions, a movable control lever adapted to release said locking plates and move the selector plates, means for guiding the lever into different portions of said angular-outlined recess in the cover, and selector gears actuated by the selector plates.

3. A selector control apparatus comprising a selector boxing having a top with an angular-outlined recess therein, selector plates movable in suitable guideways in said cover, means for locking the plates in neutral positions, a movable control lever adapted to release said locking plates and move the selector plates, an angular-outlined plate through which said lever passes and mounted upon the faces of said selector plates and adapted to engage the angles of the recess of said cover to guide the lever, and selector gears actuated by said selector plates.

4. A selector control apparatus comprising a selector boxing having a top with an angular-outlined recess therein, selector plates movable in suitable guideways in said cover, means for locking the plates in neutral positions, a movable control lever adapted to release said locking plates and move the selector plates, an angular-outlined plate through which said lever passes and mounted upon the faces of said selector plates and adapted to engage the angles of the recess of said cover to guide the lever, means for holding said angle plate flat against the upper surfaces of the selector plates as it is moved to different positions, and selector gears actuated by said selector plates.

5. A selector control apparatus comprising a selector boxing having a top with an angular-outlined recess therein, selector plates movable in suitable guideways in said cover, means for locking the plates in neutral positions, a movable control lever adapted to release said locking means and move the selector plates, an angular-outlined plate through which said lever passes and mounted upon the faces of said selector plates and adapted to engage the angles of the recess of said cover to guide the lever, a spring bearing against the upper surface of the angled plate and adapted to hold the same in contact with the upper surfaces of the selector plates, and selector gears actuated by said selector plates.

6. A selector control apparatus comprising a selector boxing having a top with an angular-outlined recess therein, selector plates movable in suitable guideways in said cover, means for locking the plates in neutral positions, a movable control lever adapted to release said locking means and move the selector plates, an angular-outlined plate through which said lever passes and mounted upon the faces of said selector plates and adapted to engage the angles of the recess of said cover to guide the lever, a spring fastened to the control lever and having portions thereof bearing against the upper surface of the angle plate to hold the same in contact with the upper faces of the selector plates, and selector gears actuated by said selector plates.

7. A selector control apparatus comprising a selector boxing having a cover with guideways therein, a bridge with notches in the opposite edges, selector plates movable in said guideways, locking plates engaging in said notches, a pivotal lever adapted to throw said locking plates out of engagement of said notches and move the selector plates to different positions, means for guiding the lever as it moves to different positions, and selector gears actuated by said selector plates.

8. A selector control apparatus comprising a selector boxing having a cover with guideways therein, a bridge with notches in the opposite edges, selector plates movable in said guideways, spring-pressed locking plates having contracted portions engaging said notches in the bridge and carried by the selector plates, a pivotal control lever adapted to move said locking plates out of engagement with said bridge and actuate a selector plate, and selector gears actuated by connections with said selector plates.

9. A selector control apparatus comprising a selector boxing having a cover with guideways therein, a bridge with notches in the opposite edges, selector plates movable in said guideways, spring-pressed locking plates having contracted portions engaging said notches in the bridge and carried by the selector plates, a control lever pivotally mounted above the control box and having a spherical-shaped end positioned intermediate said locking plates and designed, as the lever is tilted, to release the locking plate and engage and move a selector plate, means for guiding the lever, and selector gears actuated by the selector plates.

10. A selector control apparatus comprising a boxing with a cover having a flange and a bridge, the inner face of the bridge having guideways, said bridge being notched, selector plates movable in said guideways and provided with recesses upon the inner edges thereof, locking plates carried by the selector plates and movable within said recesses and adapted to engage the notches in the bridge to lock the same in neutral positions, a tilting lever having one end positioned between said locking plate and designed to release the same from said notches and engage the recess in the selector plate and upon a further tilting movement of the lever to actuate the selector plate longitudinally, selector gears, and connections between the same and said selector plates.

11. A selector control apparatus comprising a selector boxing having a cover with a flange and a bridge, the inner face of the bridge having guideways, said bridge being notched, selector plates movable in said guideways and provided with recesses upon the inner edges thereof, locking plates carried by the selector plates and movable within said recesses and adapted to engage the notches in the bridge to lock the same in neutral positions, a tilting lever having one end positioned between said locking plates and designed to release the same from said notches and engage the recess in the selector plate and upon a further tilting movement of the lever to actuate the selector plate longitudinally, a driving shaft journaled in said boxing and a gear wheel fixed thereto, a driven shaft journaled in alinement with said driving shaft and having a square-outlined portion, shifting gears movable upon said square-outlined portion of the driven shaft, a counter shaft with selector gear wheels mounted thereon, and means connected to the selector plates and adapted to actuate the gears upon said square-outlined shaft.

12. A selector control apparatus comprising a selector boxing having a cover with a flange and a bridge, the inner face of the bridge having guideways, said bridge being notched, selector plates movable in said guideways and provided with recesses upon the inner edges thereof, locking plates having stems movable through apertures in the selector plates, springs interposed between the locking plates and the bottoms of said recesses upon said stems, a portion of each locking plate designed to engage a notch in the bridge of the cover, a control lever pivotally mounted above the cover and having a spherical-shaped end positioned intermediate said locking plates, means for guiding the lever as it is tilted, selector gears, and means connected to the selector plates for actuating the same.

13. A selector control apparatus comprising a selector boxing with a cover having a flange and a bridge, the inner face of the bridge having guideways, said bridge being notched, selector plates movable in said guideways and provided with recesses upon the inner edges thereof, locking plates carried by the selector plates and movable within said recesses and adapted to engage the notches in the bridge to lock the same in neutral positions, a tilting lever having one end positioned between said locking plates and designed to release the same from said notches and engage the recess in the selector plate and upon a further tilting movement of the lever to actuate the selector plate longitudinally, a driving shaft journaled in said boxing and a gear wheel fixed thereto, a driven shaft journaled in alinement with said driving shaft and having a square-outlined portion, shifting gears movable upon said square-outlined portion of the driven shaft, a counter shaft with selector gear wheels mounted thereon, and forked arms projecting from said selector plates and adapted to actuate gear wheels upon the square portions of said driven shaft.

14. In combination with the floor, a selector boxing mounted underneath the same, a control lever having universal pivotal movement in suitable bearings in said floor and having its lower end spherical-shaped, said boxing having a cover with an opening therein, the marginal outline of which is angular, selector plates movable in suitable guide plates underneath said cover, said spherical-shaped end of the lever passing through the opening in the cover, locking plates carried by the selector plates, means for holding the same in locked positions, the spherical-shaped end of the lever adapted to be positioned intermediate the locking plates, means for guiding the lever as it is moved into different positions, selector gears, and means carried by the selector plates for actuating said gears.

In testimony whereof I hereunto affix my signature in presence of two witnesses.

HARVEY R. DE BRA.

Witnesses:
R. E. PARSHALL,
SARAH C. DE BRA.